United States Patent [19]

Harcúba et al.

[11] 4,051,754

[45] Oct. 4, 1977

[54] HEATED CUTTER FOR PLASTICS MATERIALS

[75] Inventors: Siegfried Harcúba, Saarbrucken; Herbert Dits, Schmelz, both of Germany

[73] Assignee: Siegfried Harcuba, Saarbrucken, Germany

[21] Appl. No.: 645,636

[22] Filed: Dec. 31, 1975

[30] Foreign Application Priority Data

Dec. 31, 1974 Switzerland ....................... 17395/74

[51] Int. Cl.$^2$ .......................... B26F 1/40; B29C 17/10

[52] U.S. Cl. ........................................ 83/124; 83/128; 83/171; 264/157; 425/290

[58] Field of Search ........................ 264/138, 153–155, 264/237, 319, 348, 157, 156; 83/15, 16, 170, 171, 124, 128; 425/289, 290, 384; 156/250–252, 510, 515

[56] References Cited

U.S. PATENT DOCUMENTS

| | | | |
|---|---|---|---|
| 2,244,550 | 6/1941 | Chandler | 264/156 |
| 2,611,434 | 9/1952 | Mugler | 83/171 |
| 3,491,651 | 1/1970 | Pascoe | 83/171 |
| 3,517,410 | 6/1970 | Rapisarda | 264/156 |
| 3,525,279 | 8/1970 | Christian | 83/171 |
| 3,654,829 | 4/1972 | Anderson | 264/156 |
| 3,793,424 | 2/1974 | Haga | 264/154 |

*Primary Examiner*—Willard E. Hoag
*Attorney, Agent, or Firm*—Oblon, Fisher, Spivak, McClelland & Maier

[57] ABSTRACT

Apparatus for cutting plastics, said apparatus comprising heated and cooled parts separated from each other by insulating means, whereby said tool is continuously working under a temperature corresponding to the temperature of the transition from a solid into a liquid phase of the plastic to be shaped.

4 Claims, 2 Drawing Figures

HEATED CUTTER FOR PLASTICS MATERIALS

The invention relates to a method for non-cutting shaping of plastics in a shaping machine having a heated tool and a tool to carry out the method.

If a plastic available on the market for technical shaping is to be punched, it shows that it deflects under the effect of the cutting pressure as e.g. teflon, hostaflon, polyvinylchloride and many others, and on the other side it tears out on the plane of shear as e.g. pertinax, epoxide and so on.

Partially, as the printed circuit board for the electronics made e.g. of a plastic with a layer of copper or other can not be usefully punched or they have to be formely pretreated by means of auxiliary devices. This is, however, time-absorbing and therefore unproportionally expensive. Perforating by means of speed drills in replacement of punching requires a procurement of expensive machines and causes a high wear of the special drills.

The production of precise parts having a clean surface as e.g. printed circuit board for electronics, packings or cockwheels, e.g. from hostaflon, by punching cannot be carried out with the known tools because of the mentioned properties of the plastics, or such a production is uneconomical. Either it will be necessary to cut the punched parts or to produce them by injecting molding in big series.

It is equally known a non-cutting shaping of plastics by means of presses with preheated tools (see e.g. the German Public Specification 1,479,878). However the heat from the tools is conducted or radiated to other press parts which cannot be admitted. The transfer of heat is especially inconvenient when e.g. during the shaping of teflon tools are used, the temperatures of which exceed 300° C.

The invention does away with the above-mentioned shortcomings of the plastic shaping. It is the object of the invention to propose a method and a tool for non-cutting shaping of plastics.

The invention relates to a method for non-cutting shaping of plastics in a shaping machine having a heated tool, characterized in that the tool continuously works under such an adjustable temperature which corresponds to the temperature of the transistion from a solid into a liquid phase of the plastic to be shaped.

The tool to carry out the method is characterized by a heated and a cooled part which parts are separated from each other by a heat insulation means.

The invention will be described by way of example with regard to the accompanying drawings in which.

Figure 1:
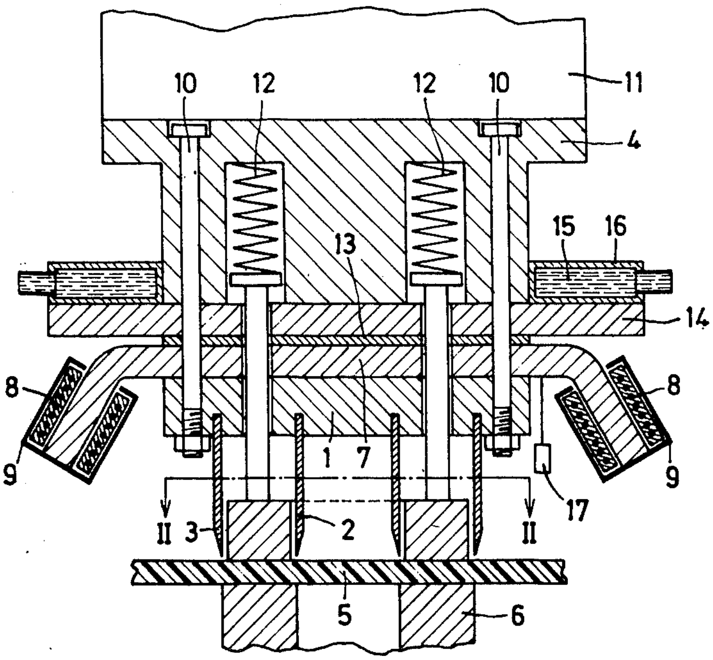
FIG. 1 shows a cross section through the body of a tool.
Figure 2:
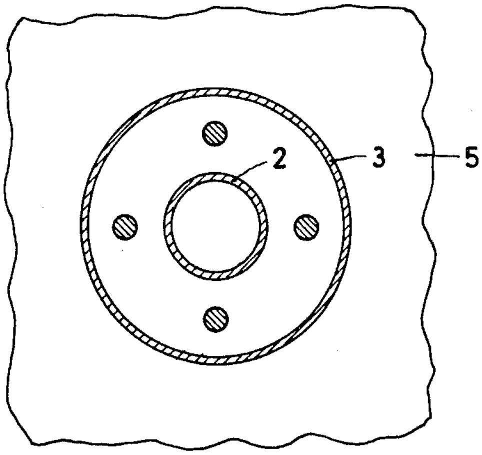
FIG. 2 shows a section according to line II—II of FIG. 1.

FIGS. 1 and 2 show a cutting tool for superfinish punching of ringlike bodies, e.g. of teflon, in a simplified way. There are inserted in the tool holder 1 two coaxial tubelike knives 2 and 3 which correspond to the ring shape. During the application of cutting pressure produced with advantage pneumatically or pneumatic-hydraulically, which pressure acts on the knives 2 and 3 via a fundamental body 4 of a press, the cutting edges of the knives 2 and 3 penetrate the material 5 supported by a support 6 and cut a ring shape out of the material. The cutting knives 2 and 3 are heated by means of a heating plate 7 arranged on the tool holder 1 to a temperature of approximately 320° C. This temperature is necessary to separate the teflon approximately between a solid and a fluid phase and thus to allow an unobjectionable precision cutting of the rings. By adjusting the temperature of the tool which corresponds with the temperature of the transition from the solid to the liquid phase of the plastic to be shaped the cutting force required for cutting the workpiece will be lowered. Because of this fact also proportionately light presses with a small energy consumption can be used in this method.

In order to heat the working tools and to keep the temperature at the required level the heating plate 7 arranged on the tool holder 1 consists e.g. of copper. It has a bent edge part which serves for intensively receiving the heating energy, as by electric heating bodies or gas flames. In the embodiment according to FIG. 1 there are arranged on the bent end part of the heating plate 7 electric heating bodies 8 which are covered by protecting caps 9. A thermostat 17 for regulating the temperature is adjustably connected to the heating plate 7. The tool packet is held together or pressed together by several fastening screws 10 of a heat conductive material whereby the heat from the heating plate 7 will be completely transferred on the lower part of the tool with the cutting knives 2 and 3 inserted therein.

In order to prevent the ram 11 of the press and the coils 12 of the ejector from being heated by the heat convection or radiation directed towards the same, the heating plate 7 is covered by a heat insulation means 13, e.g. a micanite plate, the other surface of which carries a cooling plate 14 which consists e.g. of copper. The cooling plate 14 is composed of spiral tubes, on the edge of which there are provided channels 16 for cooling medium 15 as water or compressed cold air, in order to remove the heat.

The shape of the tool can be changed by an expert and there can be used other forms of the tools for other shaping purposes, in order to shape the plastics in different ways.

The non-cutting shaping of plastics by means of a tool the continuous working process of which is thermally adjustable to the respective properties of the plastics allows on the field of the precision punching and precision perforating a mass application in mechanics and electronics with the effect of improving the technical quality, lowering the waste and stepping by the economy.

Besides, the working conditions on the working place are improved by application of the inventive idea because it removes the damaging conditions to the health during the cutting of plastics.

The heating and cooling devices in connection with the knife-like tools which are preferably used for precision punching and precision perforating can be carried out uniformly with a standard tool holder. With tool tandems for multiple shaping each shaping part and each function part of the tool tandem is separately positioned in a heated and a cooled part of the tool. It is possible to use instead of the electric heating or instead of the cooling with water also other heating and cooling arts. In this case it would be also possible to place the heating device out of the contact with the tool, as against the cooling device could be brought in connection with the same.

What is claimed is:

1. A cutting apparatus for cutting soft materials such as plastic sheets, said cutting apparatus comprising at least one cutting means, a heated part, and a cooled part, the heated part and the cooled part being separated from each other by a heat insulator, means for continuously operating the cutting means at a predetermined temperature so that the plastic to be cut will be at its transition temperature from solid to liquid, the heated part comprising a heating plate of a high thermal conductivity; and the cooled part comprising a cooling plate of a high termal conductivity, the heating plate comprising edge portions which extend beyond the cutting means, means disposed adjacent the edge portions of the heating plate for heating the edge portions of the heating plate, the cooling plate comprising edge portions which extend beyond the cutting means and means disposed adjacent the edge portions of the cooling plate for cooling the edge portions of the cooling plate, said heated part being connected to said cutting means by heat conductive means, said cooling part being disposed between said heated part and a ram, adapted to actuate said cutting part, to protect said ram from heat.

2. A cutting apparatus according to claim 1 wherein the heating plate edge portions are downwardly disposed in a bent position.

3. A cutting apparatus according to claim 1 wherein the means for heating the edge portions of the heating plate comprise electric heating bodies and the means for cooling the edge portions of the cooling plate comprise a channel through which is passed a cooling medium.

4. A cutting apparatus according to claim 3 wherein the heat insulator comprises an insulating plate disposed between the heating plate and the cooling plate, said apparatus further comprising fastening screws to hold together the heating plate and the cooling plate.

* * * * *